(12) United States Patent
Joussemet

(10) Patent No.: US 12,267,627 B2
(45) Date of Patent: Apr. 1, 2025

(54) METHOD AND SYSTEM FOR TELETRANSMITTING TO A PROCESSING SITE A VIDEO STREAM CAPTURED ON A REMOTE INTERVENTION SITE

(71) Applicant: Dassault Systèmes, Vélizy-villacoublay (FR)

(72) Inventor: Lionnel Joussemet, Antony (FR)

(73) Assignee: Dassault Systèmes, Vélizy-villacoublay (FR)

( * ) Notice: Subject to any disclaimer, the term of this patent is extended or adjusted under 35 U.S.C. 154(b) by 0 days.

(21) Appl. No.: 17/055,325

(22) PCT Filed: May 13, 2019

(86) PCT No.: PCT/FR2019/051070
§ 371 (c)(1),
(2) Date: Nov. 13, 2020

(87) PCT Pub. No.: WO2019/220043
PCT Pub. Date: Nov. 21, 2019

(65) Prior Publication Data
US 2021/0185280 A1    Jun. 17, 2021

(30) Foreign Application Priority Data
May 14, 2018    (FR) ...................................... 1854006

(51) Int. Cl.
*H04N 7/18* (2006.01)
*B64U 101/26* (2023.01)
(Continued)

(52) U.S. Cl.
CPC ........... *H04N 7/183* (2013.01); *G06F 21/602* (2013.01); *G06V 20/10* (2022.01); *G06V 20/46* (2022.01);
(Continued)

(58) Field of Classification Search
None
See application file for complete search history.

(56) References Cited

U.S. PATENT DOCUMENTS 6,873,256 B2 * 3/2005 Lemelson .............. G08B 7/066
340/521
8,145,007 B2 * 3/2012 Davey ...................... H04N 7/18
348/39
(Continued)

FOREIGN PATENT DOCUMENTS

EP          2765502 A1      8/2014
WO     20196128781 A1     10/2009

OTHER PUBLICATIONS

International Search Report for International Application No. PCT/FR2019/051070 dated Sep. 23, 2019, 2 pages.
(Continued)

*Primary Examiner* — Gelek W Topgyal
(74) *Attorney, Agent, or Firm* — TraskBritt

(57) ABSTRACT

A method for teletransmitting to a processing site a captured video stream of a remote intervention scene comprises modifying the captured video stream so as to erase defined zones, then transmitting this stream thus modified to the processing site. The teletransmitting method is employed to remotely assist a field operator with an intervention on a site that is sensitive in terms of confidentiality. The video stream may be captured directly by the operator or from a drone, for example.

19 Claims, 3 Drawing Sheets

(51) Int. Cl.
*B64U 101/30* (2023.01)
*G06F 21/60* (2013.01)
*G06V 20/10* (2022.01)
*G06V 20/40* (2022.01)

(52) U.S. Cl.
CPC ...... *B64U 2101/26* (2023.01); *B64U 2101/30* (2023.01); *G06F 2221/2125* (2013.01)

(56) References Cited

U.S. PATENT DOCUMENTS

| | | | |
|---|---|---|---|
| 10,949,670 B1* | 3/2021 | Plougmann | G06Q 20/322 |
| 2003/0234725 A1* | 12/2003 | Lemelson | G08B 7/066 |
| | | | 340/521 |
| 2008/0314681 A1* | 12/2008 | Patel | A62B 3/00 |
| | | | 182/18 |
| 2013/0093788 A1 | 4/2013 | Liu et al. | |
| 2013/0162817 A1* | 6/2013 | Bernal | G06V 40/161 |
| | | | 382/105 |
| 2016/0034704 A1* | 2/2016 | Shim | H04N 23/80 |
| | | | 726/26 |
| 2016/0180743 A1 | 6/2016 | Ahmad | |
| 2016/0253563 A1* | 9/2016 | Lam | H04L 63/08 |
| | | | 348/130 |
| 2016/0328180 A1* | 11/2016 | Wang | G06F 3/0683 |
| 2017/0289623 A1 | 10/2017 | Bailey et al. | |
| 2017/0300757 A1 | 10/2017 | Wolf | |
| 2018/0159971 A1* | 6/2018 | Yang | G06F 21/36 |
| 2018/0190032 A1* | 7/2018 | Barnett | G06T 5/002 |
| 2021/0150006 A1* | 5/2021 | Novik | G06F 21/6245 |
| 2021/0218907 A1* | 7/2021 | Michaud | G08B 13/19686 |

OTHER PUBLICATIONS

International Written Opinion for International Application No. PCT/FR2019/051070 dated Sep. 23, 2019, 9 pages.

Chinese First Office Action for Chinese Application No. 201980039779, dated Dec. 29, 2023, 16 pages.

Chinese Search Report for Chinese Application No. 201980039779, dated Jun. 7, 2024, 2 pages.

Chinese Second Office Action for Chinese Application No. 201980039779, dated Jun. 7, 2024, 30 pages with translation.

* cited by examiner

METHOD AND SYSTEM FOR TELETRANSMITTING TO A PROCESSING SITE A VIDEO STREAM CAPTURED ON A REMOTE INTERVENTION SITE

CROSS-REFERENCE TO RELATED APPLICATIONS

This application is a national phase entry under 35 U.S.C. § 371 of International Patent Application PCT/FR2019/051070, filed May 13, 2019, designating the United States of America and published as International Patent Publication WO 2019/220043 A1 on Nov. 21, 2019, which claims the benefit under Article 8 of the Patent Cooperation Treaty to French Patent Application Serial No. 1854006, filed May 14, 2018.

TECHNICAL FIELD

The present disclosure concerns a method for teletransmitting to a processing site a video stream captured on a remote intervention site. It also concerns a system implementing the teletransmission method.

BACKGROUND

One particular field of the present disclosure is teleassistance for operations of all kinds performed on remote intervention sites, particularly industrial operations such as preventive or corrective maintenance operations or inspection operations.

Another field of the present disclosure is the captured video stream teletransmission from mobile, terrestrial, aerial or aquatic platforms, particularly for inspection purposes.

The teletransmission of information from a remote intervention site is currently performed by using numerous communication vectors, whether wired via communication networks or wireless using wireless or satellite communication.

In the field of teleassistance, the teletransmitted information generally comprises video streams generated from video capture equipment employed by a field operator.

In video teleassistance, field operators load a camera intended to capture a stream of images of equipment on which maintenance or operations will be performed. Teleassistance can either be synchronous or asynchronous. The video stream is transmitted by digital communication means, such as the IP network via satellite or a land-based network.

The tele-expert receives the stream, analyzes it, and returns information to the operator to assist him. This information can include multimedia data and/or procedural instructions.

Document EP 2765502 A1 thus discloses a teleassistance method contributing to providing enhanced information to a field operator.

Document WO 2009128781 also discloses a remote display method and device.

Document US 2017/300757 A1 discloses an image capture method and system providing protection for confidentiality and privacy. It does not describe remote assistance of a field operator on an intervention scene, no stream of information being provided from the processing site to the intervention scene.

One disadvantage of the current methods is found in the excessive comprehensiveness of the transmitted information. The captured and transmitted information can contain superfluous information, some of it even secret, which can present risks in terms of security of facilities or of economic or technological intelligence.

The purpose of the present disclosure is to propose a teletransmission method intended to reduce the transmission of information solely to data that are necessary and sufficient to properly carry out an intervention or an inspection. Another purpose of the present disclosure is to optimize the quantity of data transmitted during the teletransmission operation and thus to be less sensitive to the technological limitations of the communication networks used.

BRIEF SUMMARY

This objective is achieved with a method for teletransmitting to a processing site a video stream captured at a remote scene of intervention, comprising a processing of the video stream in such a way as to erase specific zones, then a transmission of the stream thus processed to the processing site, wherein it is implemented to remotely assist a field operator working on a unit or object having a known geometric shape in the remote scene of intervention.

Thus, it becomes possible to avoid having sensitive information contained in the scene of intervention or on the unit itself be intercepted on the communication channels used between an intervention site and an appraisal site. For example, this sensitive information can involve a geographic location, a building or visually identifiable equipment. It can also be information contained on a label or any other medium affixed to the unit undergoing an intervention. Such information can also be of a contextual nature, such as natural or artificial lighting conditions or atmospheric or weather conditions.

By using the teletransmission method according to the present disclosure, a teleassistance tool can be proposed on sensitive intervention sites that considerably limits the risk of interception of confidential data by third parties during the teletransmission of information, particularly of images or video stream transmitted by an operator working on site.

In one particular implementation of the present disclosure, the teletransmission method further comprises the steps of:
  capturing a video stream relating to an intervention scene including the unit or object,
  extracting a limited stream from the unit or object,
  processing the extracted video stream in order to erase specific zones,
  transmitting the video stream thus processed to a teleassistance site,
  interpreting the stream at the teleassistance site, with a view to enriching the stream and/or generating an instruction,
  transmitting the enriched stream and/or the instruction from the teleassistance site to the field operator, and
  restoring to the field operator the stream and/or the instructions via suitable interfaces.

A zone of interest not to be transmitted can be previously known or identified at the scene of intervention. The identification of this zone of interest not to be transmitted can also be performed by a field operator via a suitable graphic interface, or it can be done automatically.

In one particular form of the present disclosure, the step of processing the extracted unit further comprises a step for modifying characteristics of the content of the video stream that are extrinsic to the identified object or unit and/or that carry semantic information inherent to the environment of the object or unit.

In another embodiment of the teletransmission method according to the present disclosure, the video stream is captured from a platform that is mobile relative to the scene of intervention. This mobile platform can be land-based, aerial or aquatic and can for example be carried by a drone. It can be controlled locally by an operator working on a remote site.

According to another aspect of the present disclosure, a system is proposed for teletransmitting to a processing site a video stream captured at a remote scene of intervention by video stream capture means, implementing the teletransmission method according to the present disclosure, comprising, at the scene of intervention, means for processing the video stream so as to erase specific zones and means for transmitting the stream thus processed to the processing site, wherein the method implements, in order to remotely assist from a teleassistance site, a field operator working on a local site on a unit or object having a known or geometric shape.

The teletransmission system according to the present disclosure can further comprise:
   means for identifying the unit or object within the video stream, and
   means for extracting a limited video stream from the specific identified unit or object.

Furthermore, graphic interface means can advantageously be provided on the scene of intervention to enable a field operator to identify the at least one zone of interest not to be transmitted.

In one particular version of the present disclosure, the means of processing the extracted unit or object can comprise means for modifying characteristics of the content of the video stream that are extrinsic to the identified unit or object and/or that carry semantic information inherent to the environment of the object or unit.

In one particular embodiment of the present disclosure, the teletransmission system can thus comprise:
   on the local site:
      means for capturing video stream relating to an intervention scene including the unit or object,
      means for processing the video stream in order to erase specific zones therefrom,
      means for transmitting the video stream thus processed to the teleassistance site,
   on the teleassistance site:
      means for interpreting the stream, with a view to enriching the stream and/or generating an instruction,
      means for transmitting the enriched stream and/or the instruction from the teleassistance site to the field operator, and
      means for restoring to the field operator the stream and/or the instructions via suitable interfaces.

In another particular version of a teletransmission system according to the present disclosure, the means for capturing, processing and transmitting the video stream are placed on board a platform that is mobile relative to the scene of intervention.

The mobile platform can advantageously be carried by a drone.

BRIEF DESCRIPTION OF THE DRAWINGS

Other advantages and features of the present disclosure will be seen from reading the detailed description of implementations and embodiments, which are in no way limiting, and from the following accompanying drawings, in which.

DETAILED DESCRIPTION

Since the embodiments described hereinafter are in no way limiting, variants of the present disclosure may also be considered comprising only a selection of described characteristics, isolated from other described characteristics (even if this selection is isolated within a sentence comprising these other characteristics), if this selection of characteristics is sufficient to confer a technical advantage or to differentiate embodiments of the present disclosure with respect to the prior art. This selection comprises at least one characteristic, preferably functional without structural details, or with only one part of the structural details if this part alone is sufficient to confer a technical advantage or to differentiate embodiments of the present disclosure with respect to the prior art.

Figure 1:
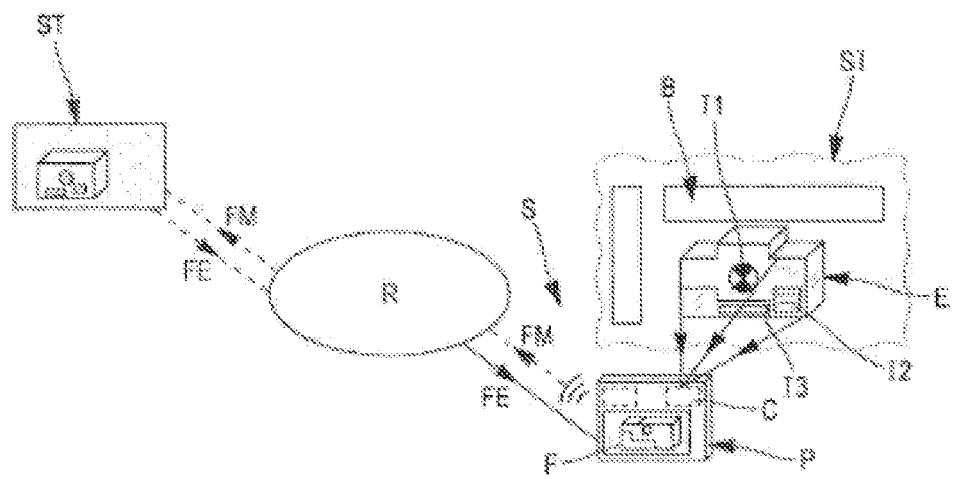
FIG. 1 schematically shows a teletransmission system according to the present disclosure.

With reference to FIG. 1, a teletransmission system S comprises portable equipment P provided with a camera, a data processing unit, a screen having a graphic interface and a wireless communication module. This portable equipment can be produced from conventional devices, such as connected tablets or telescopes, or can be specifically designed for a given use. This portable equipment P incorporates software means designed to process a video stream captured by the camera.

A field operator (not shown) working on an intervention scene SI uses the portable equipment P to produce a video of this intervention scene and more particularly of a technical unit E located in this intervention scene SI. The video stream thus captured comprises both the unit E and a background B.

The teletransmission method according to the present disclosure is implemented in a software module included in the portable equipment P. This method is configured to modify the captured stream F in such a way that zones of interest I1, I2, I3 visible on the unit E are deleted from the stream. The stream FM thus modified can then be transmitted by a communication network, not necessarily secured end to end, to a remote teleprocessing site ST. The modified stream FM thus received is then processed so as to be enriched, for example, by augmented reality techniques, then returned in the form of an enriched stream FE to the portable equipment P of the field operator.

Figure 2:
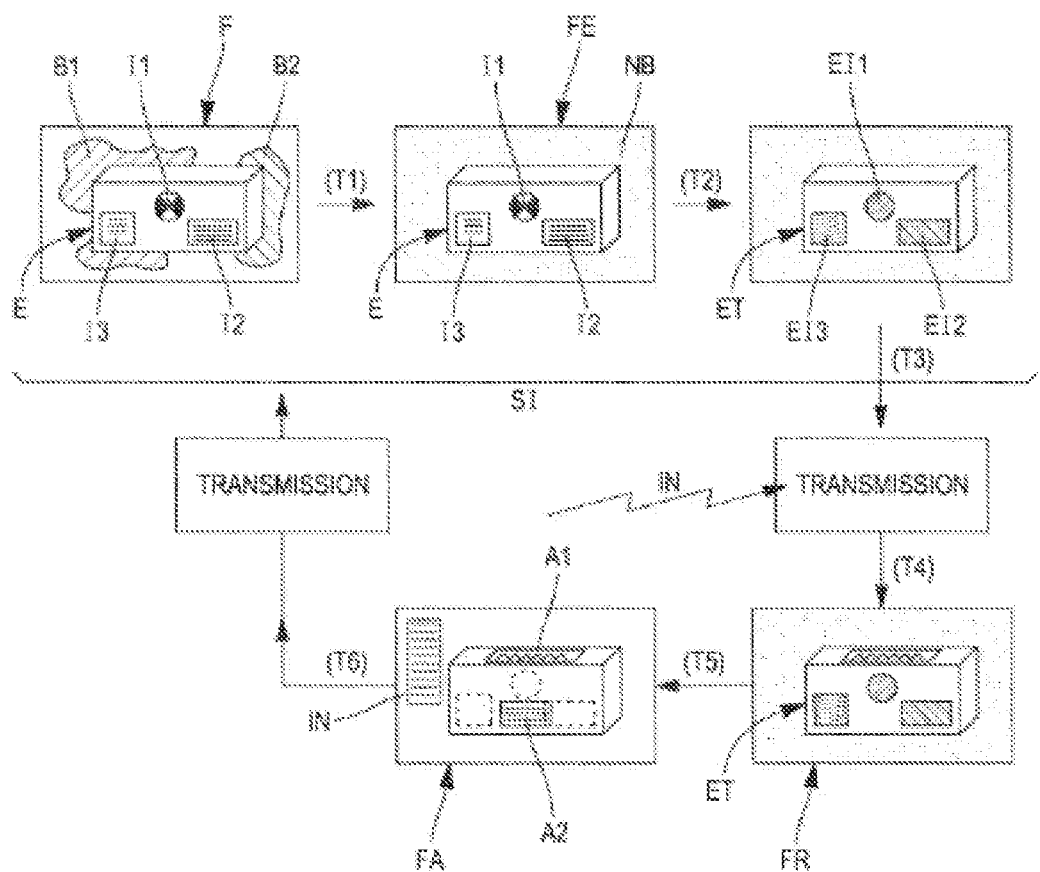
FIG. 2 schematically shows a first embodiment of the teletransmission method according to the present disclosure for a teleassistance operation.

With reference to FIG. 2, a description will now be provided of the different steps of the teletransmission method according to the present disclosure, implemented in the configuration of FIG. 1.

The stream F captured by the sensor C of the portable equipment P, potentially a camera, comprises both an image of the unit E including zones of interest I1, I2, I3 and background elements B1, B2.

The zones of interest for which transmission is not desired can include, for example, a graphic design or a logo I1 that represents a risk or a specific function. These zones of interest can also include labels or title blocks containing critical information I2, I3.

A first processing step T1 is designed to identify the unit E within the scene of intervention and to extract it in order to obtain an extraction video stream FE with a neutral background NB no longer containing usable information.

Several methods of extraction in a video stream are already available in the state of the art. Document US 2013/0093788 A1, in particular, can be cited, which discloses a method for making a real object disappear in a display in mixed reality.

The neutralization of a subset of the image (background of the observed object, descriptive elements or others) consists of applying neutral colorimetric properties to the group(s) of pixels composing the subset. In other words, the properties of the pixels, generally defined by float values (example: RGB), are assigned the same color. In a second processing step T2, the zones of interest I1, I2, I3 are identified then erased from the video stream FE in order to obtain a processed video stream FT in which the unit ET thus processed no longer contains zones of interest, which are replaced by erased zones EI1, EI2 and EI3.

A video stream consists of a succession of images conventionally composed of pixels ordered in lines and columns. The identification of a unit known a priori within a video stream thus consists in determining, for each of the images composing the stream, one or more subsets of pixels corresponding to zones (in the sense of pixels) in which the unit appears.

The identification of a unit known a priori, such as zones of interest I1, I2, I3, can be done automatically and deterministically if the position of the camera at the origin of acquisition relative to the unit is known (in the spatial sense), as well as the intrinsic characteristics of the camera.

The position of the camera relative to the unit known a priori can be done through a model-based resetting consisting in determining the position according to an optimization approach intended, both locally and globally, to juxtapose the unit as observed and the geometric representation thereof known a priori.

Localization can also be done more trivially by locating the camera within the reference frame of an easily identifiable and locatable visual landmark (referring to datamatrix type markers), for which the position of the landmark is known within the reference frame of the unit to be identified (in the spatial sense).

Depending on their typology (background, identification plate, logo, or others), the zones of interest to be erased can be colorized in different ways. However, it can also be provided for these erased zones to appear as transparent in the processed video stream to be transmitted.

This stream thus processed—with a neutral background and zones of interest erased—is then transmitted (T3). If an attempt at interception IN should succeed on the modified video stream FT during transmission, the informational harm would necessarily be reduced because the intercepted stream would be difficult to use to determine the location of the scene of intervention.

The remote processing site ST receives (T4) this modified video stream representing the processed image ET of the unit E. The received video stream FR is then processed (T5) in such a way that it is enhanced or enriched by addition of information A1, A2 and instructions or orders IN. The video stream thus enhanced FA can then be transmitted (T6) to the portable equipment P of the field operator.

Figure 3:
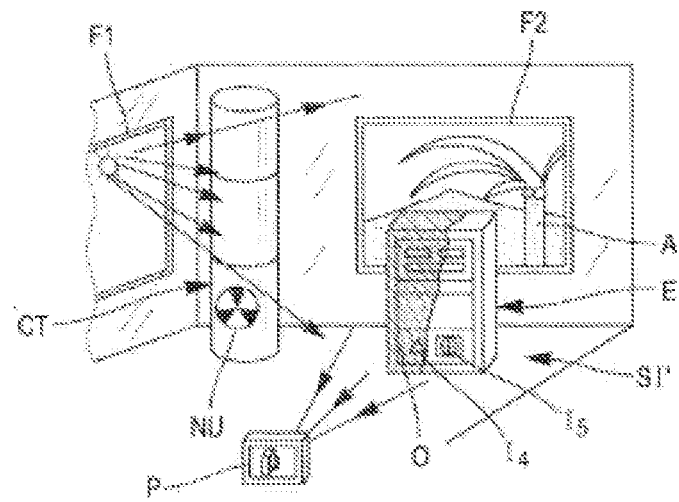
FIG. 3 schematically shows a particular example of a scene of intervention carried out with the teletransmission method according to the present disclosure.
Figure 4:
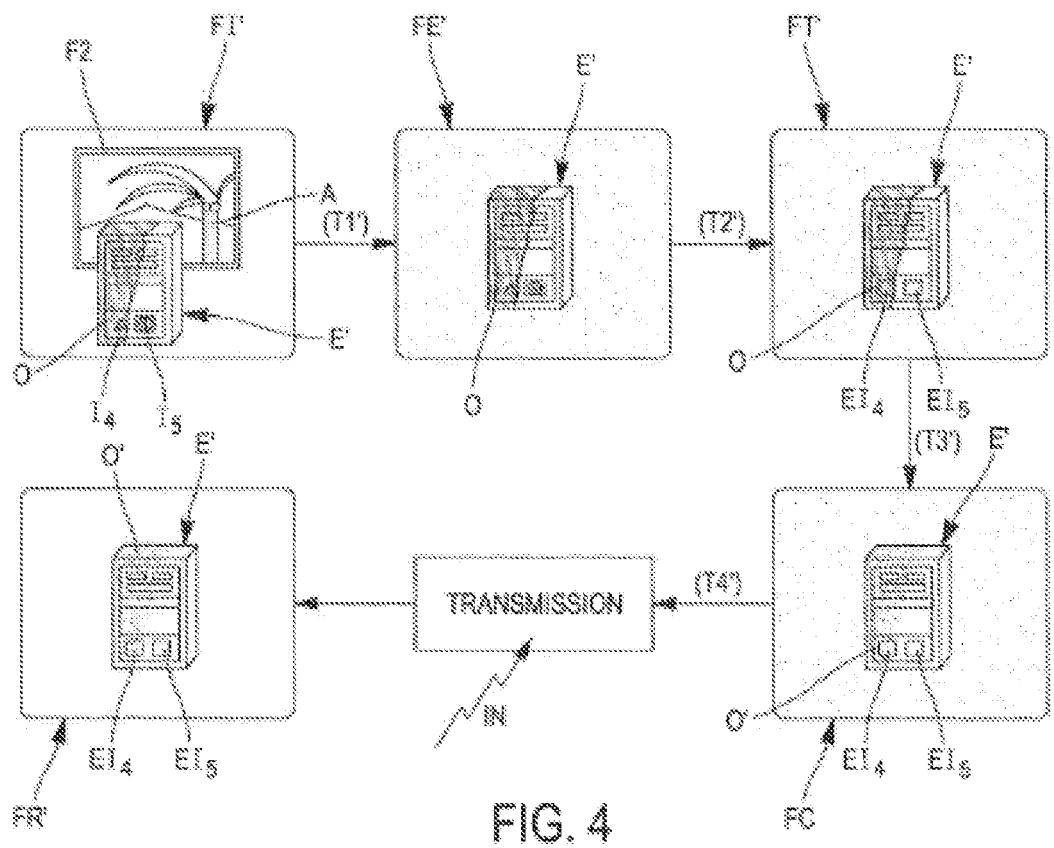
FIG. 4 schematically shows a second embodiment of the teletransmission method according to the present disclosure, in the context of intervention represented in FIG. 3.

With reference to FIGS. 3 and 4 the teletransmission method according to the present disclosure can also be implemented to delete in the transmitted video stream any contextual information related to an intervention scene.

An intervention scene SI' comprises, by way of nonlimiting example, equipment E' installed in a room provided with two windows F1, F2. A large size object CT, placed in the vicinity of the unit E, causes a drop shadow O on the equipment E' due to solar radiation through the first window F1. The second window F2, situated behind the unit E', faces a characteristic landscape A including, for example, a tree typical of the vegetation of the zone. Moreover, the unit E' itself comprises two zones of interest I4, I5 the transmission whereof is not desired.

The large size object CT can, for example, be provided with a label NU indicating the presence of radioactive components or materials. If the field operator decides to produce a video stream containing this object CT, this video stream will then be processed in such a way as to erase the contents of the previously identified label NU, in the video stream that will be teletransmitted.

The stream FI captured by the camera of the portable equipment P comprises both the drop shadow O and a view of the background landscape visible through the window F2. This shadow and this landscape could be used by an unauthorized third party intercepting the transmitted stream for the purpose of determining the location of the scene of intervention. It is therefore essential to avoid the transmission of this contextual information.

A first step (T1') contributes to extracting from the video stream FI' the only video image of the unit E', which then has a neutral background. The extraction stream FE' is then processed (step T2') so as to erase the two zones of interest I4, I5. The stream thus processed FT' then comprises a video image of the unit E' comprising two erased zones EI4, EI5.

The function of a third step (T3') is to attenuate or modify the drop shadow O so as to generate a corrected video stream FC, which includes modified information about the solar lighting conditions, for example, by means of optical or digital filters designed to appreciably attenuate the shadow effects or the specularities, which would then become difficult to interpret for a third party who would intercept the video stream after processing. This corrected video stream FC, comprising substituted zones EI4, EI5 and an attenuated shadow O', can then be transmitted (step T4') by the communication network and received by the processing site ST in the form of a received video stream FR'.

Figure 5:
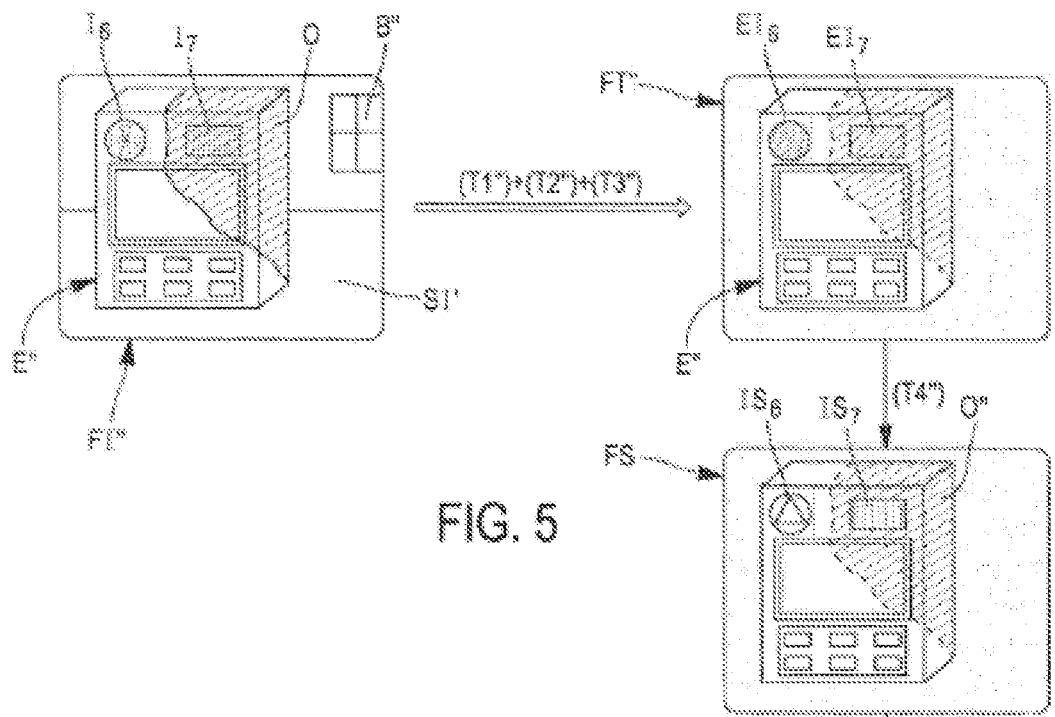
FIG. 5 schematically shows a third embodiment of the teletransmission method according to the present disclosure, including video stream substitutions.

With reference to FIG. 5, a third embodiment of the teletransmission method according to the present disclosure can also be provided in which the video stream actually transmitted no longer includes zones of interest but includes substituted zones and possibly a drop shadow substantially attenuated or modified by optical or digital filters. The desired objective is then to mislead an unauthorized third party who might intercept the transmitted video stream.

A field operator has captured a video stream FI" by his portable equipment P, representing in a scene of intervention SI" a unit E" in front of a background B", the unit E" comprising, for example, two zones of interest I6, I7.

Processing steps T1", T2", T3"—similar to those of T1', T2', T3' just described with reference to FIG. 4—respectively and successively enable extracting the unit E" from its background, erasing the zones of interest I6, I7 and processing by filtering of the drop shadow O on the unit E". Thus, a processed video stream FT" is obtained comprising a processed version O" of the drop shadow.

With a view to compromising the exploitation of portions of conveyed images, several conventional infographic processes can be used. By working randomly on the properties of the images within a video stream (gamma, exposure, contrast, lighting) prior to their transmission, the ability to interpret them can be drastically limited with respect to the capture context (natural versus artificial lighting, orientation of the light, etc.).

In addition to neutralizing properties of the images, it is also conceivable to apply additional textures previously calculated on the basis of 3D renderings. Thus, drop shadows that are credible but not present in the observed reality can be embedded in the transmitted image, falsifying its interpretation by a potential interceptor.

A new processing step (T4") is designed to substitute fictional zones of interest IS6, IS7, for real zones of interest I6, I7.

For example, it can involve applying a color joined with a set of pixels for which the semantic information they carry is to be deleted.

Thus, a substituted video stream FS is obtained, which can then be transmitted (T5") by a communication network to the processing site ST, which receives a video stream FR" including at the same time a modified image of the unit E". In the event of undesirable interception during transmission of the substituted video stream FS, its use would lead to erroneous interpretations thus making it possible to protect the information sources about the actual location of the scene of intervention.

Figure 6:
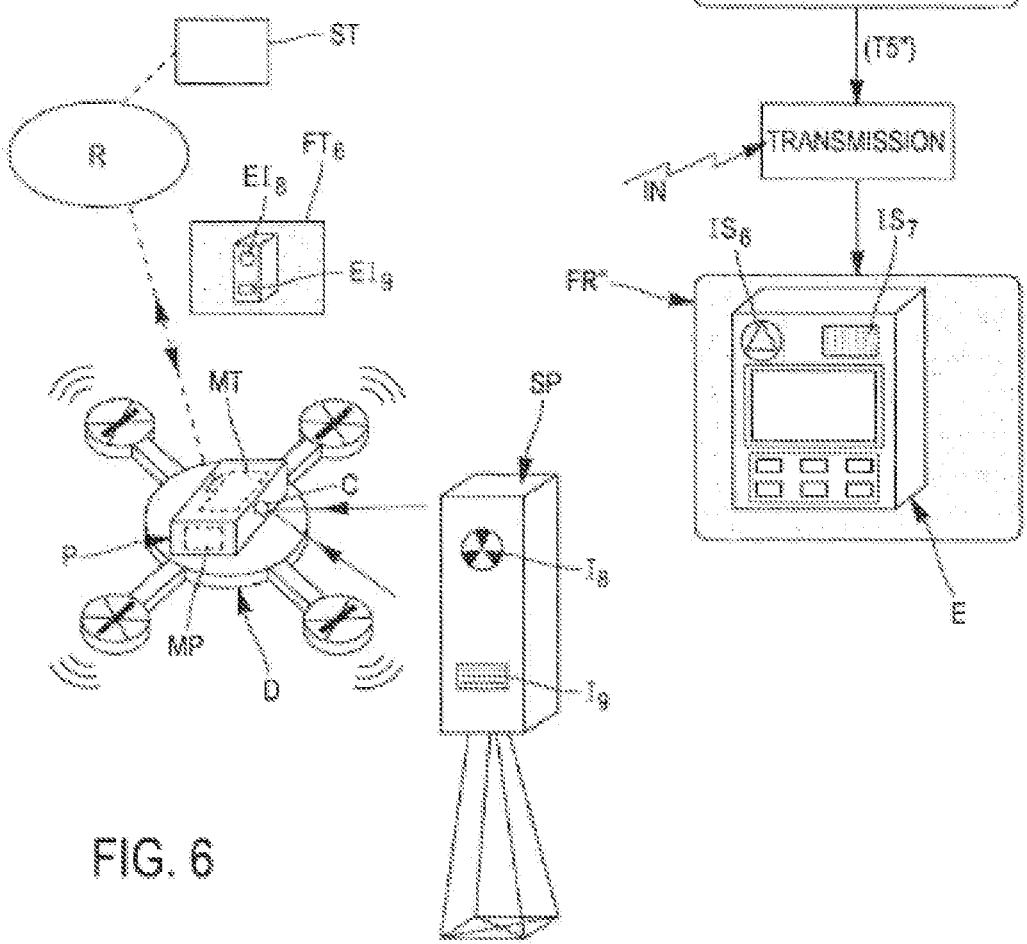
FIG. 6 schematically shows a particular application of a teletransmission system according to the present disclosure, on board an inspection drone.

A teletransmission system according to the present disclosure can also be installed within a mobile platform P carried by an inspection drone D, as shown in FIG. 6. This drone D is, for example, provided for inspecting technical equipment SP having, on one or more of the faces thereof, zones of information I8, I9 the transmission of which is undesirable because the interception thereof by third parties would be prejudicial. For example, zone I8 can be a symbol indicating the presence of radioactive materials or components while zone I9 can comprise data related to the origin of this technical equipment.

When the inspection drone D approaches the technical equipment SP, the camera C thereof captures a video stream corresponding to inspection objectives. A processor MP incorporated in the mobile platform P locally processes this video stream, identifies the zones of interest I8, I9 as shapes corresponding to predetermined shapes and erases these zones of interest. The video stream thus processed FT6, including erased zones EI8, EI9, is then transmitted by a wireless transmission unit MT to a communication network R, then routed to a processing site ST. This drone can then be controlled by an operator working on site.

Of course, the present disclosure is not limited only to the examples that have just been described, and many other embodiments can be envisaged within the scope of the present disclosure. Thus, the equipment involved in the teletransmission operations implemented in the systems according to the present disclosure can be of any type. These teletransmission operations can also be implemented for purposes other than telesurveillance or inspection from mobile platforms.

The invention claimed is:

1. A method for teletransmitting to a remote processing site a video stream captured at a scene of intervention, the method comprising:
on the intervention scene:
capturing the video stream on a unit or object within the intervention scene, from a portable equipment held by a field operator at the intervention scene;
modifying the captured video stream in such a way that content in one or more zones of interest is erased from the captured video stream, including a step for modifying contextual characteristics of the captured video stream that allow determination of a location of the unit or object; and
transmitting the modified captured video stream from the intervention scene to a remote teleprocessing site via one or more communication networks;
on the remote teleprocessing site:
receiving the modified captured video stream from the intervention scene via the one or more communication networks;
processing the modified captured video stream so as to be enriched by addition of instructions or orders by augmented reality techniques; and
returning the enriched video stream to the portable equipment via the one or more communication networks and displaying the enriched video stream on the portable equipment, to provide remote assistance to the field operator.

2. The method of claim 1, wherein the one or more zones of interest are on the unit or object.

3. The method of claim 2, wherein the one or more zones of interest to be erased are previously known.

4. The method of claim 3, wherein the one or more zones of interest to be erased are identified at the intervention scene.

5. The method of claim 4, wherein identification of the one or more zones of interest to be erased is performed by a field operator via a graphic interface.

6. The method of claim 1, wherein modifying the captured video stream in such a way that the content in the one or more zones of interest is erased comprises neutralization of the content by applying neutral colorimetric properties of pixels in the one or more zones of interest.

7. The method of claim 1, further comprising:
identifying, in the captured video stream, the content in the one or more zones of interest to include contextual information that allows determination of the location of the unit or object.

8. The method of claim 7, wherein modifying the captured video stream is performed so as to prevent determination of the location of the unit or object based on the contextual information.

9. A system for teletransmitting to a processing site a video stream captured at an intervention scene, comprising a portable equipment configured to be held by a field operator on the intervention scene, the portable equipment including a camera, a data processing unit, a screen having a graphic interface, and a wireless communication module,
the camera being provided for capturing the video stream on a unit or object within the intervention scene, the data processing unit being provided for modifying the captured video stream in such a way that content in one or more zones of interest is erased from the captured video stream, and for modifying contextual characteristics of the captured video stream that allow determination of a location of the unit or object, the wireless communication module being provided (i) for transmitting the modified captured video stream via one or more communication networks to a remote teleprocessing site provided for processing the modified captured video stream so as to be enriched by addition of instructions or orders by augmented reality techniques, and (ii) for receiving the enriched video stream from the remote teleprocessing site via the one or more communication networks and displaying the enriched video stream on the portable equipment, to provide remote assistance to the field operator.

10. The system of claim 9, wherein the data processing unit is further provided for:
   identifying the unit or object within the captured video stream; and
   extracting a limited video stream from the captured video stream, the limited video stream including the identified unit or object and excluding a background of the intervention scene.

11. The system of claim 9, wherein the data processing unit is further provided for:
   identifying on the unit or object the one or more zones of interest to be erased; and
   erasing the one or more zones of interest within the video stream to be transmitted.

12. The system of claim 9, wherein the graphic interface is provided for a field operator to identify the one or more zones of interest to be erased.

13. The system of claim 9, wherein the data processing unit is further provided for:
   identifying, in the captured video stream, the content in the one or more zones of interest to include contextual information that allows determination of the location of the intervention scene,
   wherein modifying the captured video stream is performed so as to prevent determination of the location of the unit or object based on the contextual information.

14. A method comprising:
   at a portable equipment configured to be held by a field operator at an intervention scene:
      capturing a video stream of a unit or object at the intervention scene;
      modifying the captured video stream in such a way as to erase content in one or more zones of interest of the captured video stream; and
      transmitting the modified captured video stream from the portable equipment to a remote teleprocessing site via one or more communication networks;
   at the remote teleprocessing site:
      receiving the modified captured video stream from the portable equipment via the one or more communication networks;
      processing the modified captured video stream so as to be enriched by addition of instructions or orders by augmented reality techniques; and
      returning the enriched video stream to the portable equipment via the one or more communication networks and displaying it on the portable equipment, to provide remote assistance to the field operator.

15. The method of claim 14, wherein the one or more zones of interest are on the unit or object.

16. The method of claim 14, wherein modifying the captured video stream in such a way as to erase the content in the one or more zones of interest comprises neutralization of the content by applying neutral colorimetric properties of pixels in the one or more zones of interest.

17. The method of claim 14, further comprising:
   at the portable equipment,
   identifying, in the captured video stream, the content in the one or more zones of interest to include contextual information usable to determine location of the unit or object.

18. The method of claim 17, wherein modifying the captured video stream is performed so as to prevent determination of the location of the unit or object based on the contextual information.

19. The method of claim 14, further comprising:
   modifying the captured video stream to substitute one or more additional zones of interest in the captured video stream with one or more fictional zones of interest including erroneous or misleading content.

* * * * *